March 26, 1929. F. A. PARSONS 1,706,587
MILLING MACHINE STRUCTURE
Filed May 2, 1925 2 Sheets-Sheet 1
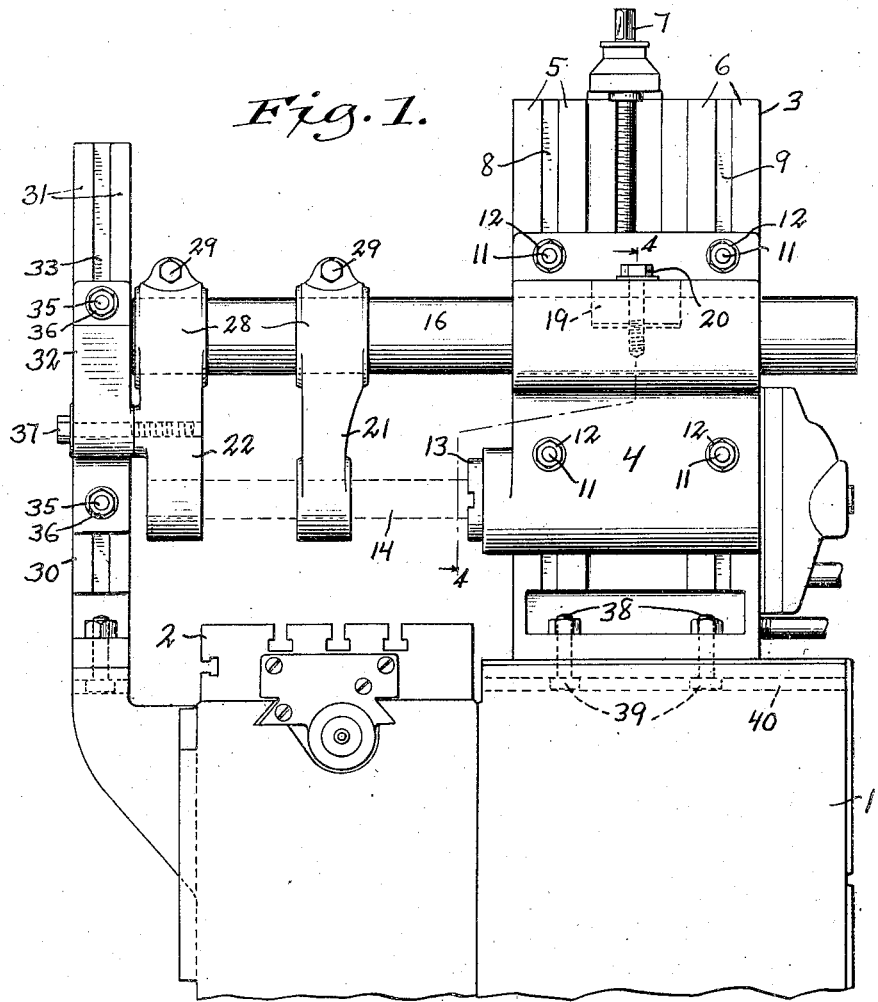
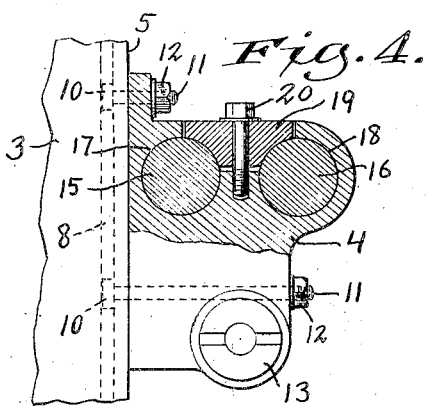
Fred A Parsons
INVENTOR.

March 26, 1929.   F. A. PARSONS   1,706,587
MILLING MACHINE STRUCTURE
Filed May 2, 1925   2 Sheets-Sheet 2

Fred A. Parsons
INVENTOR.

Patented Mar. 26, 1929.

1,706,587

UNITED STATES PATENT OFFICE.

FRED A. PARSONS, OF MILWAUKEE, WISCONSIN, ASSIGNOR TO KEARNEY & TRECKER CORPORATION, OF WEST ALLIS, WISCONSIN.

MILLING-MACHINE STRUCTURE.

Application filed May 2, 1925. Serial No. 27,392.

This invention relates to milling machine structures and the object of the invention is to improve the construction and operation of milling machines in the manner to be hereinafter described and claimed.

Figure 2:
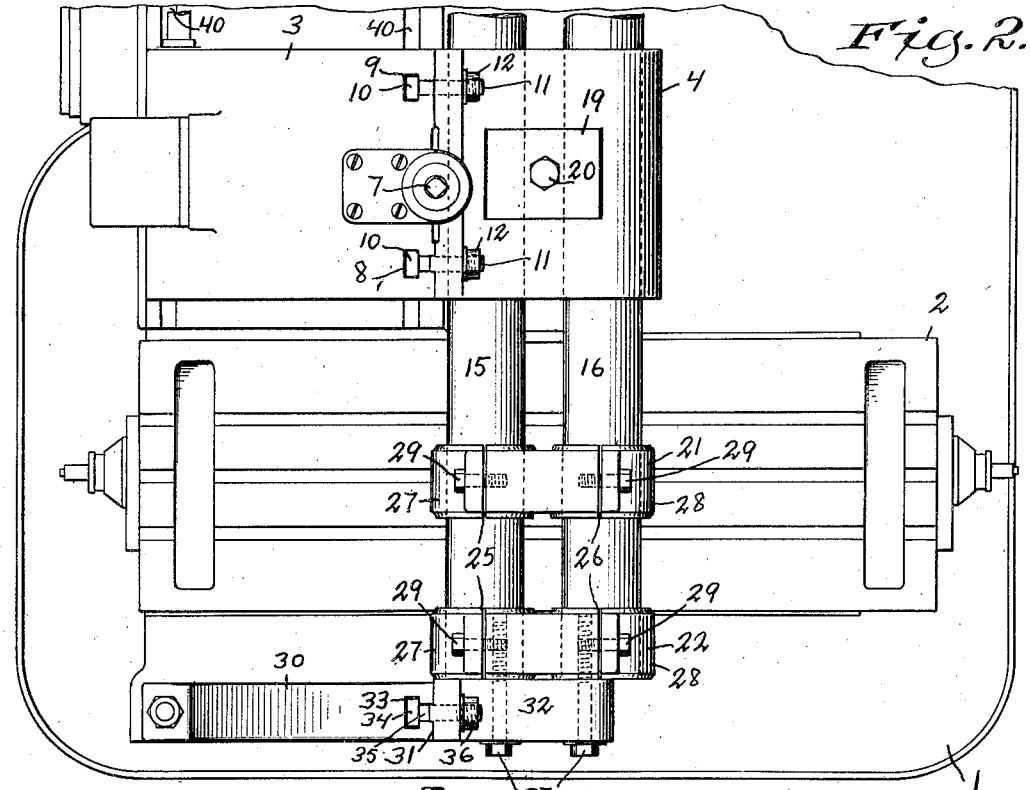
Figure 3:
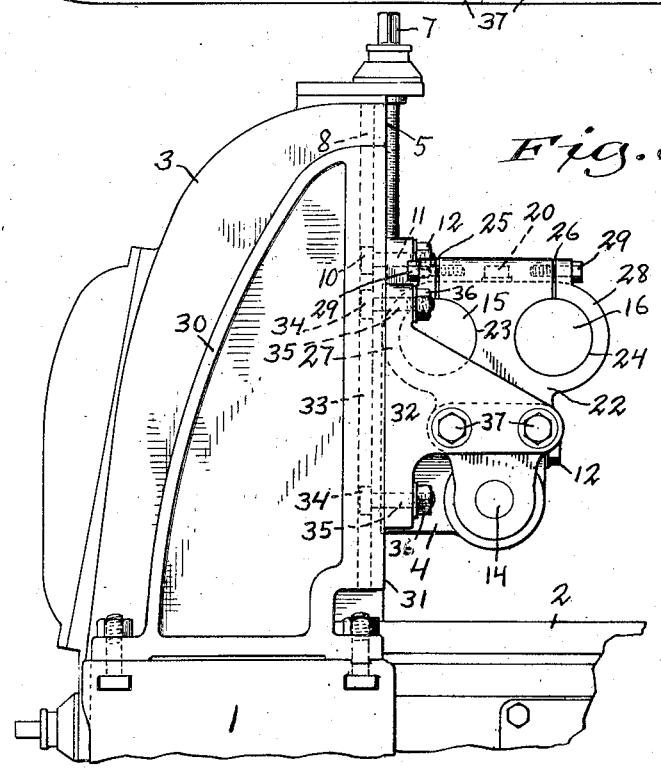

Referring to the drawings, which accompany this specification and form a part hereof, which drawings illustrate an embodiment of this invention, and on which drawings the same reference characters are used to designate the same parts wherever they may appear in each of the several views, Fig. 1 is a side elevation of parts of a milling machine; Fig. 2 is a plan view of the milling machine, parts being broken away; Fig. 3 is an end elevation of the milling machine, parts being broken away; and Fig. 4 is an elevation of parts of the milling machine, with parts shown in section, the section being taken on the line 4—4 on Fig. 1, looking in the direction indicated by the arrows.

Referring to the drawings, the reference numeral 1 designates a bed on which a table 2 is slidably mounted, and on which a head frame 3 is also slidably mounted so that it can be moved in a direction at right angles to the direction of movement of the table 2. A spindle carrier 4 is mounted so as to be vertically movable against the slideways 5 and 6 on the front side of the head frame 3, a screw 7 being provided for effecting such vertical movement. The slideways are provided with T-slots 8 and 9 for the reception of the heads 10 of bolts 11. When the nuts 12 are tightened, the spindle carrier is held firmly in position against the slideways 5 and 6 in a well-known manner. The spindle carrier 4 is provided with a spindle 13 which is capable of rotating a tool arbor 14. A plurality of overarms 15 and 16 pass through bores 17 and 18 in the spindle carrier 4 and may be clamped tightly in said bores by a clamping member 19 and a bolt 20. The tool arbor 14 is preferably provided with bearings in two pendants 21 and 22, and these pendants are secured to the overarms 15 and 16. Each pendant is illustrated by the drawings as provided with two bores 23 and 24, the axes of which are in the same horizontal plane, and slots 25 and 26 extend from these bores through the upper parts of the pendants so that the parts 27 and 28 of the pendants are movable on account of the spring of the metal and can be clamped on the overarms or released therefrom by means of bolts 29, in a manner which will be readily understood.

A harness, or bracket, 30 is secured to the bed of the machine and has a vertical face 31 against which a bracket 32 may be secured. The vertical face 31 of the harness or bracket 30 is provided with a T-slot 33 to receive the heads 34 of bolts 35. The bolts 35 are provided with nuts 36 and it will be readily seen, from an inspection of the drawings, that, by loosening the nuts 36, the bracket 32 is free to be moved up or down on the vertical face 31 of the harness or bracket 30. The outer pendant 22 can be secured to the bracket 32 by bolts 37 and thus the pendant 22, the bracket 32 and the harness or bracket 30 form strong and substantial outboard bearings for the ends of the overarms 15 and 16 and the end of the tool arbor 14.

The head frame 3 is slidable in or out upon the bed 1 and is retained in any selected position by bolts 38, which have their heads 39 within T-slots 40 in the bed 1. When the head frame 3 is to be moved, the bolt 20 can be unscrewed to release the clamping member 19 and the overarms 15 and 16 will be freed sufficiently from the spindle carrier 4 so that they do not interfere with the movement of the head frame 3 and the spindle carrier 4 which is connected thereto.

What I claim is:

1. In a milling machine, the combination with a bed, of a head frame rigidly secured thereto, a spindle carrier vertically adjustable with respect to said bed and adapted to be rigidly secured to said head frame, a spindle carried by said spindle carrier, a tool arbor projecting from said spindle and vertically adjustable therewith, a plurality of overarms projecting from and carried by said spindle carrier and adapted to be rigidly secured thereto, a harness or bracket rigidly secured to said bed, a pendant adapted to be rigidly fixed with said overarms and provided with a bearing for said tool arbor, and means for rigidly supporting the projecting portions of said overarms from said harness or bracket when said carrier is in any of its positions of adjustment, whereby a supporting structure is formed permitting vertical adjustment of said tool arbor but adapted to rigidly support said tool arbor from said bed in any of their positions of adjustment.

2. In a milling machine, the combination of a stationary bed, a work support reciprocable thereon, a head frame fixed with said bed adjacent a longitudinal edge of said work support, a carrier vertically movable on said head frame, a tool spindle rotatably supported from said carrier for vertical movement therewith, a tool arbor carried by said spindle and projecting over said work support, an overarm structure supported from said carrier for vertical movement therewith and for adjustment relative thereto parallel with said spindle axis, said carrier and overarm structure providing mutually cooperating guide surfaces for said adjustment and substantially preventing other relative movement therebetween, and a pendant supported from said overarm structure above said work support, said guide surfaces on said overarm structure being extended to provide surfaces cooperating with said pendant for the support and alignment of said tool arbor.

3. In a milling machine, the combination with a stationary bed, of a headframe uprising therefrom, a spindle carrier vertically movable on said head frame and adapted to be rigidly secured thereto, a tool spindle journaled in said spindle carrier, a tool arbor removably fixed with said spindle and projecting over said bed, an overarm structure supported from said carrier for vertical movement therewith and for adjustment relative thereto in a direction parallel with the spindle axis, said carrier and overarm structure having cooperating guide surfaces substantially preventing other relative movement therebetween, means for rigidly fixing said overarm structure with said carrier, and a pendant fixed with said overarm structure and providing a bearing for the end of said arbor over said bed.

4. In a milling machine, the combination with a bed, of a headframe rigidly secured thereto, a carrier vertically adjustable with respect to said bed and adapted to be rigidly secured to said headframe, a rotatable spindle carried by said carrier, an arbor fixed with said spindle to project over said bed, a projecting overarm structure supported from said carrier for vertical movement therewith and for adjustment relative thereto in a direction parallel with the axis of said spindle, said carrier and overarm structure having complementary guide portions substantially preventing other relative movement therebetween, means for rigidly securing said overarm structure to said carrier in various positions of said relative adjustment, a pendant adjustably fixed with said overarm structure and having a bearing for the projecting end of said tool arbor, a harness or bracket removably fixed with said bed, and means for rigidly supporting the projecting portions of said overarm structure from said harness or bracket when said carrier is in various positions of its vertical adjustment.

5. In a milling machine, the combination of a bed, a table reciprocably guided thereon, a headframe uprising from said bed adjacent a longitudinal edge of said table, a spindle carrier bodily vertically movable on said head frame, a horizontal tool spindle journaled in said carrier and having its axis transverse to the path of table movement, an arbor removably fixed in said spindle and projecting over said table, an overarm structure supported from said carrier for bodily vertical movement therewith and adjustable in a path parallel with the axis of said spindle, said carrier and overarm structure having mutual guide surfaces preventing other relative movement therebetween and arranged to position said overarm structure above said arbor and substantially symmetrically arranged with reference to a vertical plane passed through the axis of said spindle, and a pendant carried by said overarm structure above said table and providing a bearing for said arbor.

In witness whereof I hereto affix my signature.

FRED A. PARSONS.